United States Patent Office 3,786,097
Patented Jan. 15, 1974

3,786,097
N,N-DIALLYL-3,7,11-TRIMETHYL-2,6,10-DODECATRIENYLAMINE
Friedrich Karrer, Basel, Switzerland, assignor to Ciba-Geigy AG, Basel, Switzerland
No Drawing. Filed June 22, 1971, Ser. No. 155,602
Claims priority, application Switzerland, June 26, 1970, 9,706/70; Oct. 8, 1970, 14,890/70
Int. Cl. C07c 87/24
U.S. Cl. 260—583 H     1 Claim

ABSTRACT OF THE DISCLOSURE

New terpenoid compounds, their manufacture and use for influencing the development of insects and representatives of the order Acarina. The compounds correspond to the formula

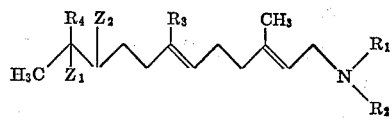

wherein $Z_1$ and $Z_2$ are each hydrogen or together form a carbon carbon bond or an oxygen bridge,
$R_1$ is $C_2$–$C_4$ alkenyl, $C_2$–$C_4$ alkinyl, cycloalkyl, $C_1$–$C_4$ haloalkyl, substituted phenyl, $C_2$–$C_4$ haloalkenyl or acyl, and
$R_2$ is hydrogen, $C_1$–$C_4$ alkyl, $C_2$–$C_4$ alkenyl, $C_2$–$C_4$ alkinyl or acyl, or
$R_1$ is hydrogen, and
$R_2$ is $C_1$–$C_4$ alkyl, or
$R_1$ and $R_2$ together with the nitrogen atom to which they are attached form a 3-membered ring, or
$R_1$ and $R_2$ are each acyl groups which, with the nitrogen atom to which they are attached form a substituted or unsubstituted heterocyclic ring, and
$R_3$ and $R_4$ are each methyl or ethyl.

---

This invention relates to new terpenoid compounds, their manufacture and their use for influencing the development of insects and representatives of the order Acarina.

According to the present invention there are provided compounds of the General Formula 1

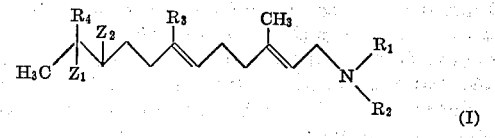

wherein $Z_1$ and $Z_2$ are each hydrogen or together form a carbon carbon bond or an oxygen bridge,
$R_1$ is $C_2$–$C_4$ alkenyl, $C_2$–$C_4$ alkinyl, cycloalkl, $C_1$–$C_4$ haloalkyl, substituted phenyl, $C_2$–$C_4$ haloalkyl or acyl, and
$R_2$ is hydrogen, $C_1$–$C_4$ alkyl, $C_2$–$C_4$ alkenyl, $C_2$–$C_4$ alkinyl or acyl, or
$R_1$ is hydrogen, and
$R_2$ is $C_1$–$C_4$ alkyl, or
$R_1$ and $R_2$ together with the nitrogen atom to which they are attached form a three membered ring, or
$R_1$ and $R_2$ are each acyl groups which with the nitrogen atom to which they are attached form an unsubstituted or substituted heterocyclic ring, and $R_3$ and $R_4$ are each methyl or ethyl. The $C_1$–$C_4$ alkyl, $C_1$–$C_4$ haloalkyl, $C_2$–$C_4$ alkenyl, $C_2$–$C_4$ haloalkyl, and $C_2$–$C_4$ alkinyl groups which $R_1$ and $R_2$ may represent can be straight or branched chain, and substituted or unsubstituted. Examples of such groups are inter alia methyl, ethyl, propyl, isopropyl, n-, i-, secondary-, tertiary-, butyl, allyl, chlorallyl, crotyl, methallyl, β-chloralkyl, β-bromalkyl, γ-chloralkyl, γ-bromalkyl, propargyl, γ-methylpropargyl etc.

The cycloalkyl groups which can be represented by $R_1$ have 3 to 8 ring carbon atoms. Examples of such cycloalkyl groups are cyclopropane, cyclopentane, cycloheptane, cyclooctane, and in particular cyclohexane.

The acyl groups which are $R_1$ and $R_2$ may represent can be substituted or unsubstituted and saturated or unsaturated, and are derived mostly from low carboxylic acids, particularly mono carboxylic acids.

Representatives of such are for example formic acid, acetic acid, mono-, di-, and trichloro acetic acid, mono- and dibromo acetic acid, trifluoro acetic acid, propionic acid, α-chloropropionic acid, α,α-dichloropropionic acid, α,β-dichloropropionic acid, α,α-dibromopropionic acid, α,β-dibromopropionic acid, butyric acid, α-bromobutyric acid, isobutyric acid, acrylic acid, methacrylic acid, crotonic acid, cyclopropanecarboxylic acid, cyclobutanecarboxylic acid and substituted or unsubstituted benzoic acids.

$R_1$ and $R_2$ can together also represent the residue of a dicarboxylic acid and thus, together with the nitrogen atom to which they are attached, form imides. Particular dicarboxylic acids which are noteworthy here are for example, phthalic acid, hydrated phthalic acids, succinic acid and maleic acids.

Examples of suitable heterocyclic rings formed by $R_1$ and $R_2$ together with the nitrogen atom to which they are attached are:

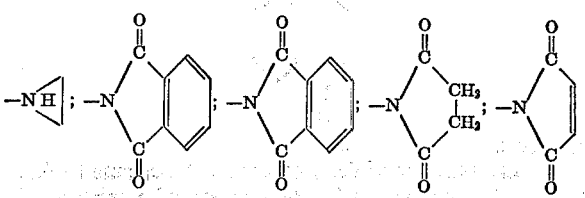

The substituents on the $C_1$–$C_4$ alkyl-, $C_2$–$C_4$ alkenyl-, $C_2$–$C_4$ alkinyl- and acyl groups and on the phenyl ring can be of first or second order.

By substituents of the first order there are to be understood base strengthening electron donors. In this the following groups are of importance: halogen atoms such as fluorine, chlorine, bromine or iodine; alkoxy and alkylthio groups with 1 to 4 carbon atoms, which can be branched or straight chained and which are preferably unbranched and containing 1 or 2 carbon atoms; low alkoxyalkyl and alkyl groups (only with phenyl) for which the above noted definitions are also relevant; primary, secondary and particularly tertiary amino groups, wherein low alkyl and alkyl groups are preferred substituents; hydroxyl and mercapto groups.

The phenyl ring can also be substituted by alkylene or alkylidene dioxy groups.

By substituents of the second order there are to be understood acidifying electron acceptors. In this respect the following groups are of note: nitroso-, nitro- and cyano-groups; tri-haloalkyl groups, wherein halo is preferably F or Cl; low alkylsulfinyl-, low alkyl sulfonyl groups, which have a branched or straight chain alkyl group with 1 to 4 carbon atoms preferably unbranched with 1 or 2 carbon atoms; sulfamoyl and sulfamido groups wherein the amino groups can have 1 or 2 substituents, preferably low alkyl groups as defined above.

Of particular importance are compounds of the formulae:

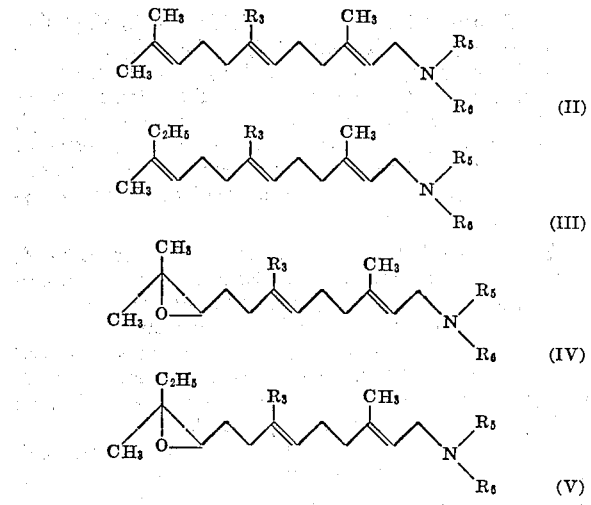

wherein $R_3$ has the meaning given for Formula I and $R_5$ is allyl, chlorallyl, methallyl, propargyl, iso-butinyl, hexyl,

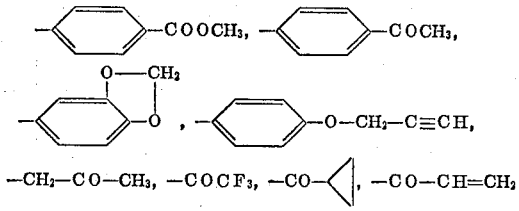

and $R_6$ is hydrogen, $C_1$–$C_4$ alkyl, allyl, chlorallyl, methallyl, propargyl, —$CH_2$—$CH_2$—O—$CH_3$ or $R_5$ is hydrogen and $R_6$ is $C_1$–$C_4$ alkyl or $R_5$ and $R_6$ together are

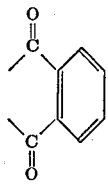

or iodine.

The manufacture of the compounds of Formula I takes place in known fashion by the reaction of a mixture of geometrical isomers of the formula

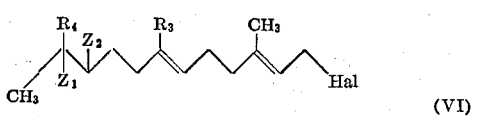

wherein Hal is halogen, preferably bromine or chlorine, and $Z_1$ and $Z_2$ are hydrogen or together are a carbon carbon bond, and $R_3$ and $R_4$ have the meaning given in Formula I, with a primary or secondary amine of the formula

wherein $R_1$ and $R_2$ have the meaning as given for Formula I with the exception of acyl groups, preferably with cooling in an inert solvent medium, and thereafter if desired epoxidization with 1 mol of a selective epoxidizing agent such as a per acid, in an inert solvent medium such as for example a halogenated hydrocarbon.

By the term "per acid," it is intended to mean primarily low peralkane acids with 1 to 6 carbon atoms such as for example peracetic acid, as well as aromatic peracids such as perbenzoic acid, and monoperphthalic acid. Especially, m-chlorobenzoic acid should be noted.

For epoxidizing non acylated amines ($Z_1$ and $Z_2$ forming together a carbon carbon bond in Formula I) the amino group is protected during the proces by salt formation with an acid before the oxidative influence of the epoxidizing agent. Acids used in this connection can be mineral or organic acids such as formic acid, halogenated aliphatic carboxylic acids, particularly trifluoroacetic acid and trichloroacetic acid.

For manufacturing the acylated compounds of Formula I, a primary or secondary amine of the formula

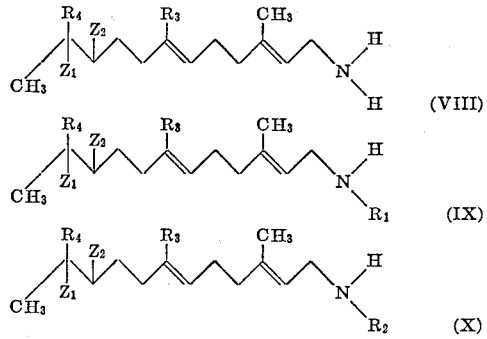

wherein $Z_1$, $Z_2$, and $R_1$–$R_4$ have the meaning given in Formula I, is reacted in known fashion with an acrylating agent, for example a carboxylic acid, carboxylic acid anhydride or carboxylic acid halide, optionally in the presence of a base.

For the manufacture of diacyl-compounds (imides $R_1$ and $R_2$ each acyl in General Formula I) a halide of the General Formula VI, preferably the bromide or chloride, is reacted with an alkaline salt, preferably with the potassium salt of an acid imide in a suitable solvent medium, e.g. a ketone such as acetone, ethylmethylketone, a low alcohol or dimethyl formamide, or an acid anhydride is allowed to react with a primary amine of the General Formula VIII with the exclusion of water in suitable solvent medium, such as for example in a aliphatic carboxylic acid, preferably at elevated temperature.

Finally, in the above described fashion, the selective epoxidization can be carried with 1 mol of a per acid in an inert solvent medium such as a halogenated hydrocarbon, preferably with cooling.

The introduction of the epoxy group into the acylated amines can, apart from with a peracid, take place also by transfer of the compounds of Formula I (wherein $Z_1$ and $Z_2$ together form a carbon carbon bond), with N-bromosuccinimide in a mixture of water with a suitable solvent medium such as tetrahydrofurane, 1,2-dimethoxyethane, dioxane, or with tertiary butanol in bromohydrin, and the transformation into an epoxide of Formula I (wherein $Z_1$ and $Z_2$ together form an oxygen bridge) takes place with the aid of a basic reagent such as an alkali carbonate or an alkali alkoxide. By alkali, particularly sodium and potassium are to be understood.

The compounds described are prepared as mixtures of the geometrical isomers as result of the synthesis. The starting materials of Formulas VI to X are known compounds which can be manufactured by known methods described in the literature.

The novel compounds of Formula I give a partial or complete inhibition of the growth of insects and representatives of the order Acarina (mites) by means of which a transition from one development stage into the next is to be understood. In the case of a development transition on the embryonic to the larval stage and from the pupa or last larval into the imaginal stage, the contact with an effective quantity of the compound of the invention in the first stage inhibits the transition to the next stage of development, whereon the insects either remain in their development stage at the time or die. The compounds are also effective as ovicides. The compounds according to the invention are exceptionally active and can be used in very small doses of $10^{-5}$ to $10^{-9}$ per insect.

The compounds according to the invention may be used, for example, against all pest insects such as aphids, such as the peach potato aphid (*Myzus persicae*), the black bean aphid (*Aphis fabae*); scale insects such as *Aspidiotus hederae, Lecanium hesperidium, Pseudococcus maritimus;* Thysanoptera (thrips) such as *Herciothrips fermoralis,* and bugs such as the beet-bug (*Piesma quadratum*) or the bed bugs (*Cimex lectularius*); butterfly grubs such as *Plutella maculipennis, Lymantria dispar* and grubs of the genus Prodenia; beetles such as Colorado beetle (*Leptinotarsa decemlineata*); Orthoptera such as the house cricket (*Acheta domesticus*); termites such as Reticulitermes; Hymenoptera, such as ants; flies such as the fruit fly *Drosophila melanogaster,* and the Mediterranean fruit fly (*Ceratitis capitata*), the house fly (*Musca domestica*), as well as mosquitoes, e.g. *Aedes aegypti* and *Anopheles stephensi.*

Further important pest insects are for example: *Tineola biselliella*, and *Carpocapsa pomonella.*

Of particular mention under pest insects are stored product pests, of which the following are to be noted as exemplary. They are all important stored product pests:

*Oryzaephilus surinamensis*
*Trogoderma granarium*
*Lasioderma sericorne*
*Chryptolestes ferrugineus*
*Stegobium paniceum*
*Necrobia rufipes*
*Anthresus vorax*
*Sitophilus granarius*
*Sitophilus oryzae*
*Sitophilus zea mais*
*Rhizoptera dominica*
*Acanthoscelides obtectus*
*Ephestia kuehniella*
*Araeocerus fasciaslatus*
*Carpophilus hermipterus*
*Tenebrio molitor*
*Tribolium castaneum*
*Tribolium destructor*
*Tribolium contusum*
*Athagenus piceus.*

The compounds of Formula I are also suitable for combatting representatives of the order Acarina such as of the families Ixodidae; Argasidae; Tetranychidae; Dermanyssidae.

The compounds of Formula I, particularly for example the compounds of the formulae

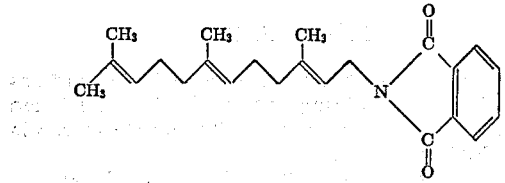

and

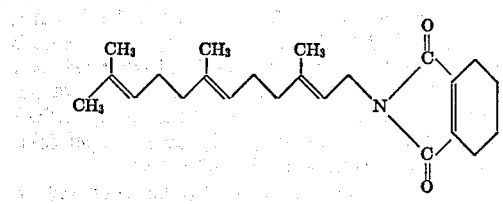

also act as synergists.

The compounds of Formula I can be used alone or together with suitable carriers and/or other additive materials.

Suitable carriers and additives can be solid or liquid and correspond to the customary materials used in formulation technique such as for example natural or regenerated mineral materials, solution, dispersion, wetting, adhesive, thickening, binding and composting agents. Furthermore, further biocidal compounds can be added thereto. Such biocidal compounds can be for example from the class of ureas, saturated or unsaturated halo fatty acids, halobenzonitriles, halobenzoic acids, phenoxyalkyl carboxylic acids, carbamates, triazines, nitroalkylphenols, organic phosphorus compounds, quaternary ammonium salts, sulfaminic acids, arsenates, arsenities, borates and chlorates.

For the purposes of application the compounds of the Formula I can be treated to form dusting agents, emulsion concentrates, granulates, dispersions, sprays, solutions or slurries in customary formulation, which is all part of the general knowledge of application techniques.

For the manufacture of directly sprayable solution for compounds of Formula I, there should be noted particularly mineral oil fractions of high to average boiling range, such as diesel oil or kerosene, coal tar oils and oils of vegetable or animal origin, together with hydrocarbons such as alkylated naphthaline, tetrahydronaphthaline, optionally with the use of xylene mixtures, cyclohexyls, ketones, and furthermore chlorinated hydrocarbons, such as trichlorethane and tetrachlorethane, trichloroethylene or tri- and tetrachlorobenzenes. It is advantageous to use organic solvent media the boiling point of which is over 100° C.

Aqueous preparations are particularly suitable as emulsion concentrates, pastes or wettable, sprayable powders which are prepared for use by the addition of water. As dispersing agents there should be noted the non-iongenic products e.g. condensation products of aliphatic alcohols, amines or carboxylic acids with a long chain hydrocarbon group from about 10 to 20 carbon atoms and ethylene oxide, such as the condensation product of octadecyl alcohol and 25 to 30 mols of ethylene oxide or that of soya fatty acids and 30 mol ethylene oxide, or that of technical oleyl amine and 15 mol ethylene oxide or that of dodecylmercaptan and 12 mol ethylene oxide. Under anion active dispersing agents which can be used there should be mentioned for example the sodium salt of dodecyl alcohol sulphuric acid ester, the sodium salt of dodecylbenzenesulphonic acid, the potassium or triethanolamine salts of oleic acid or abietic acid or mixtures of these acids or the sodium salt of a petroleum sulphonic acid. As cation active dispersing agents, there can be used quaternary ammonium compounds such as cetylpyridiumbromide or dioxyethylbenzyldodecyl ammonium chloride.

In the manufacture of dusting and spreading agents, there can be used as solid carrier materials talcum, kaolin, bentonite, calcium carbonate, and even coal, cork flour, wood flour, and other materials of vegetable origin. Particularly useful is the manufacture of preparations in granulated form. The various application forms can include in known fashion of materials which improve the distribution, the adherence, the rain resistance or the impregnation ability thereof; such materials are for example fatty acids, resins, glues, casein, or alginates.

The following examples will serve to illustrate the invention.

EXAMPLE 1

A mixture of 22 g. 1-bromo-3,7,11-trimethyl-2,6,10-dodecatriene and 20 ml. diethylether was added dropwise at about −4° C. within one hour to 22 g. of freshly distilled diallylamine. The mixture was then stirred for 1 hour at 0° C. and 20 hours at room temperature. After dilution with diethylether the reaction mixture was first washed 3 times with 40 ml. of 20% aqueous caustic potash and then several times with water. The ether solution of the tertiary base was dried over sodium sulphate, the solvent removed under vacuum and the remaining N,N-diallyl-3,7,11-trimethyl - 2,6,10 - dodecatrienylamine distilled under high vacuum. B.P. 123–124° C./0.01 torr; $n_D^{20}$: 1.4896.

EXAMPLE 2

28.5 g. 1-bromo-3,7,11-trimethyl-2,6,10-dodecatriene, mixed with 30 ml. diethylether, was added dropwise within one hour with stirring and at −2 to 0° C. to 20.5 g. dipropargylamine, whereon a gradual precipitate formed. The mixture was then stirred for 1 hour at 0° C. and 15 hours at room temperature. The reaction mixture was then diluted with diethylether, and then washed three times with 50 ml. of 20% aqueous caustic potash, and then several times with water. The solution of the tertiary base was dried over sodium sulphate, freed of ether in vacuo and the residue distilled under vacuum. Colorless N,N-dipropargyl-3,7,11-trimethyl - 2,6,10 - dodecatrienylamine is obtained, of B.P. 124–125° C./0.04 torr; $n_D^{20}$: 1.5005.

EXAMPLE 3

A mixture of 14.3 g. 1-bromo-3,7,11-trimethyl-2,6,10-dodecatriene and 10 ml. diethylether was added dropwise within an hour with stirring at 0° C. to 20 g. of di-(2-chloroallyl)amine. The mixture was then stirred for 20 hours at room temperature. The reaction mixture was then treated as noted in Example 1 and the N,N-di-(2-chloroallyl)-3,7,11-trimethyl-2,6,10-dodecatrienylamine remaining was purified by chromatography on aluminium oxide (elutriation agent: methylacetate; hexane 1:12). $n_D^{20}$: 1.5050.

EXAMPLE 4

A mixture of 28.5 g. 1-bromo-3,7,11-trimethyl-2,6,10-dodecatriene and 25 ml. diethylether was added dropwise within an hour with stirring to 21 g. of 1-methylamino-1-methylpropine cooled to −5° C. The mixture was then stirred further for 5 hours at 0° C. and 11 hours at room temperature. The reaction mixture was then treated as in Example 1 and the resultant N-methyl-N-(1-methyl)-propinyl - 3,7,11 - trimethyl - 2,6,10 - dodecatrienylamine distilled under high vacuum. B.P. 142–143° C./0.02 torr; $n_D^{20}$: 1.4879.

EXAMPLE 5

28.5 g. of 1-bromo - 3,7,11 - trimethyl - 2,6,10-dodecatriene in 50 ml. of 1,2-dimethoxyethane were added dropwise within 3 hours at room temperature to a solution of 13.7 g. 3,4-methylenedioxyaniline and 14.5 g. ethyl-diisopropylamine in 70 ml. of 1,2-dimethoxyethane. The mixture was then stirred for 16 hours at room temperature, the precipitated ethyl-diisopropylamine-hydrobromide filtered off and the filtrate freed from solvent in vacuo. The residue was taken up in 200 ml. diethylether-n-hexane (1:1), washed several times with water and the organic phase dried over sodium sulphate. After sucking off the solvent invacuo, the residue was subjected to chromatography on silica gel (elutriation agent: ether-n-hexane 1:12), by means of which pure (3,7,11-trimethyl-2,6,10-dodecatrienyl)-3,4-methylenedioxyaniline ($n_D^{20}$: 1.5456) and pure N,N-di-(3,7,11-trimethyl-2,6,10-dodecatrienyl)-3,4-methylenedioxyaniline ($n_D^{20}$: 1.5354) were obtained.

EXAMPLE 6

A mixture of 17 g. 1-bromo-3,7,11-trimethyl-2,6,10-dodecatriene and 20 ml. ether was added dropwise at 20° with stirring and within 3 hours to 69 g. allylamine. After 18 hours stirring at room temperature, the excess allylamine was completely distilled from the reaction mixture, and the residue diluted with 200 ml. ether-n-hexane (1:1), and then washed twice with 20% aqueous caustic potash and finally several times with water. After drying the solution over sodium sulphate, the ether and n-hexane were distilled off and the remaining N-allyl-3,7,11-trimethyl-2,6,10-dodecatrienylamine distilled in vacuo. B.P. 104–106° C./0.03 torr; $n_D^{20}$: 1.4888.

EXAMPLE 7

At 10–15° C., 10 ml. of acetic acid anhydride were added dropwise with stirring to 13 g. of N-allyl-3,7,11-trimethyl-2,6,10-dodecatrienylamine. After 16 hours stirring at room temperature the excess acetic acid anhydride was taken up in 100 ml. water, with ice cooling, and the reaction mixture extracted with ether-n-hexane 1:1. The purified ether-hexane phases were washed neutral with saturated aqueous sodium bicarbonate solution. Then, after twice washing with a little water, the mixture was dried over sodium sulphate and the solvent distilled off in vacuo. The remaining N-acetyl-N-allyl - 3,7,11 - trimethyl-2,6,10-dodecatrienylamine was purified by chromatography on silica gel with methyl acetate-n-hexane (2:3). $n_D^{20}$: 1.4968.

EXAMPLE 8

At 0° C., 1.6 ml. of trifluoroacetic acid were added to 6.03 g. N,N-diallyl-3,7,11-trimethyl - 2,6,10 - dodecatrienylamine in 60 ml. dichloromethane, and then a solution of 4.1 g. 86% m-chloroperbenzoic acid in 30 ml. dichloromethane-diethylether (9:1) was added dropwise with stirring within 4 hours. After 10 hours stirring at 0–5° C., the reaction mixture was diluted with hexane, washed thrice with 30 ml. of 10% aqueous caustic potash and then washed neutral with water. After drying the organic phase over sodium sulphate, the solvent was distilled off and the product chromatographically purified on aluminum oxide (activity III) (elutriation agent diethylether-n-hexane, 1:9), by means of which colorless N,N-diallyl-10,11-epoxy-3,7,11-trimethyl - 2,6 - dodecadienylamine is obtained. $n_D^{20}$: 1.4847.

EXAMPLE 9

A solution of 5.9 g. 86% m-chloroperbenzoic acid in 40 ml. dichloromethane-diethyl ether (9:1) was added dropwise with stirring within 3 hours at −2 to 0° C. to 8.8 g. N-acetyl-N-allyl-3,7,11-trimethyl - 2,6,10-dodecatrienylamine in 90 ml. of dichloromethane. After a further 24 hours stirring at 0–2° C., the reaction mixture was diluted with n-hexane, washed thrice at 0° C. with 30 ml. 10% aqueous caustic potash and then with water. After drying the organic phase over sodium sulphate, the solvent was distilled off and the product purified chromatographically on silica gel (activity III) (elutriation agent methyl acetate n-hexane 1:2), by means of which colorless N-acetyl-N-allyl-10,11-epoxy - 3,7,11 - trimethyl-2,6-dodecadienylamine was obtained. $n_D^{20}$: 1.4820.

EXAMPLE 10

9.5 g. dry potassium phthalimide were added in portions within 2 hours with stirring and at 35° C. to a solution of 14.5 g. 1-bromo-3,7,11-trimethyl-2,6,10-dedecatriene in 200 ml. absolute acetone.

The mixture was then stirred for 25 hours at 35–40° C., filtered from the precipitate and the acetone removed in vacuo. The residue was then taken up in 200 ml. n-hexane, washed thrice with 30 ml. 10% ice cold caustic potash and four times with water, the organic phase dried over sodium sulphate and then n-hexane sucked off in vacuo. The N - (3,7,11 - trimethyl-2,6,10-dodecatrienyl)-phthalimide was purified by chromatography on silica gel (elutriation agent: ether-hexane 1:4). $n_D^{20}$: 1.5442.

The following compounds can also be prepared in fashion analogous to that given in Examples 1–10.

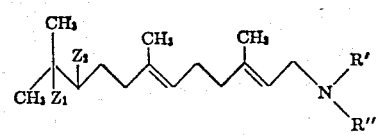

| R'/R'' (−N group) | $Z_1, Z_2$ | $n_D^{20}$ | B.P. (° C.) |
|---|---|---|---|
| −N(CH₂−CCl=CH₂)(CH₂−CH₂−CH₃) | −C−C− | 1.4902 | 78–80/0.01 torr. |
| −N(CH₂−C(CH₃)=CH₂)(CH₂−C(CH₃)=CH₂) | −C−C− | 1.4870 | 130–134/0.05 torr. |
| −N(CH₂−C(CH₃)=CH₂)(CH(CH₃)CH₃) | −C−C− | 1.4822 | 73–75/0.01 torr. |
| −N(cyclohexyl-H)(CH₃) | −C−C− | 1.4955 | 130–133/0.02 torr. |
| −N(aziridine, H) | −C−C− | 1.4922 | |
| −N(H)(C₂H₅) | −C−C− | 1.4813 | 84–86/0.015 torr. |
| −N(H)(C₃H₇(n)) | −C−C− | 1.4805 | 88–90/0.01 torr. |
| −N(H)(CH₂−CH=CH₂) | −C−C− | 1.4888 | 104–106/0.03 torr. |
| −N(CHO)(CH₂−CH₃) | −C−C− | 1.4925 | |
| −N(CHO)(CH₂−CH₃) | −O− | 1.4877 | |
| −N(COCF₃)(CH₂−CH₃) | −O− | 1.4586 | |
| −N(CO−cyclopropyl-H)(CH₂−CH₃) | −C−C− | 1.5005 | |

TABLE—Continued

| Structure | Bond | $n_D^{20}$ | B.P. |
|---|---|---|---|
| -N(CO-cyclopropyl)(CH₂-CH₃) | —O— | 1.4950 | |
| -N(COCH₃)(CH₂-CH₂-O-cyclopropyl) | —C—C— | 1.4913 | |
| -N(COCH₃)(CH₂-CH₂-O-cyclopropyl) | —O— | 1.4857 | |
| -N(CO—CH=CH₂)(cyclopropylmethyl) | —C—C— | 1.5038 | |
| -N(CO—CH=CH₂)(cyclopropylmethyl) | —O— | 1.4980 | |
| -N(H)(CH₃) | —C—C— | 1.4840 | 75–77/0.012 torr |
| -N(CH₂—CH=CH₂)₂ | —C—C— | 1.4899 | 109–110/0.01 torr. |
| -N(CH₂—CH≡CH)₂ | —O— | 1.4960 | |
| -N(CH₃)(CH₂—C≡CH) | —C—C— | 1.4893 | 107–109/0.02 torr. |
| -N(H)(C₆H₄—COOCH₃) | —C—C— | 1.5583 | |
| -N(H)(C₆H₄—COCH₃) | —C—C— | 1.5753 | |
| -N(H)(benzodioxole) | —C—C— | 1.5456 | |
| -N(H)(C₆H₄—O—CH₂—C≡CH) | —C—C— | 1.5432 | |

* —C—C means an additional C—C bond.

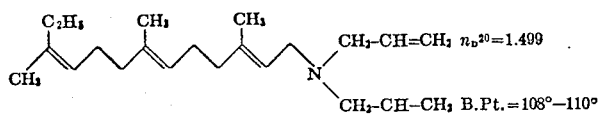

$n_D^{20} = 1.499$
B.Pt. = 108°–110°

EXAMPLE 11

Dusting agent

Equal parts of an active substance of Formula 1 and precipitated silica were finely ground. By mixing with kaolin or talcum, dusting agents with a preferred active agent content of 1–6% could be made therefrom.

Sprayable powder

For making a sprayable powder, the following components, for example, are mixed and finely ground.

50 parts active agent according to the invention
20 parts highly absorbent silica
25 parts bolus alba (kaolin)
1.5 parts 1-benzyl-2-stearyl-benzimidazol-6,3'-disulphonate, sodium salt
3.5 parts reaction product of p-tert. actyl phenol and ethylene oxide.

Emulsion concentrate

Well soluble active agents can be formulated as emulsion concentrates according to the following directions:
20 parts active agent; 70 parts xylene; 10 parts of a mixture of a reaction product of an alkyl phenol with ethylene oxide and calcium dodecylbenzene sulphonate are mixed together. On diluting with water to the desired degree, a sprayable emulsion results.

Granulates 7.5 g. of an active substance according to Formula 1 are dissolved in 100 ml. acetone, and the acetonic solution so obtained added to 92 g. granulated attapulgite. The whole was well mixed and the the solvent removed in a rotary evaporator. A granulate of active agent content about 7.5% is obtained.

EXAMPLE 12

Determination of the biological activity of the compounds of Examples 1-8

With the aid of a micro-applicator, solutions of various concentrations of active agent in acetone were applied to 1-24 hour old pupae of *Epitachne varivestis*. The so treated pupae were kept at 25° C. until the pupal skin was shed, which normally takes 5-6 days. After this time, the following effects of the treatment of the test animals could be determined: the animals were dead or showed positive symptoms; a treatment was considered negative if morphological changes could be determined on neither the treated animals nor on animals from the eggs of the treated animals. Classified as positive, as well as the dead, were all adultoid intermediate forms, which still showed definite features of the pupal stage.

In comparison with untreated control animals, no delay in emergence arose with the treated pupae. 10 animals were treated per concentration of active agent. The inhibiting action of compounds of the following formulae were evaluated in micrograms per pupal from the numbers of dead and positive reacting test animals:

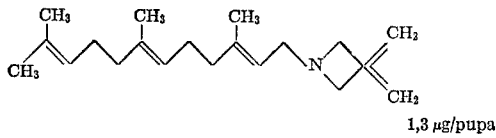

1,3 µg/pupa

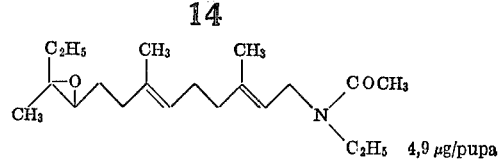

4,9 µg/pupa

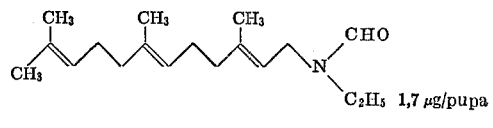

1,7 µg/pupa

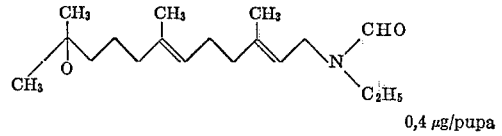

0,4 µg/pupa

What is claimed is:
1. A compound of the formula

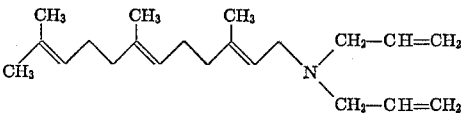

References Cited
UNITED STATES PATENTS
3,541,154  11/1970  Schmialek et al. ___ 260—583 H LEWIS GOTTS, Primary Examiner
R. L. RAYMOND, Assistant Examiner U.S. Cl. X.R.
260—239 E, 326 R, 340.5, 348 R, 348 A, 471 R, 557 R, 561 R, 561 HL, 561 N, 563 R, 577, 584 A, 584; 424—375